Oct. 21, 1958 E. MACK 2,856,838
FARM PRODUCE OR LIKE AERATING DEVICE
Filed July 26, 1954 2 Sheets-Sheet 1
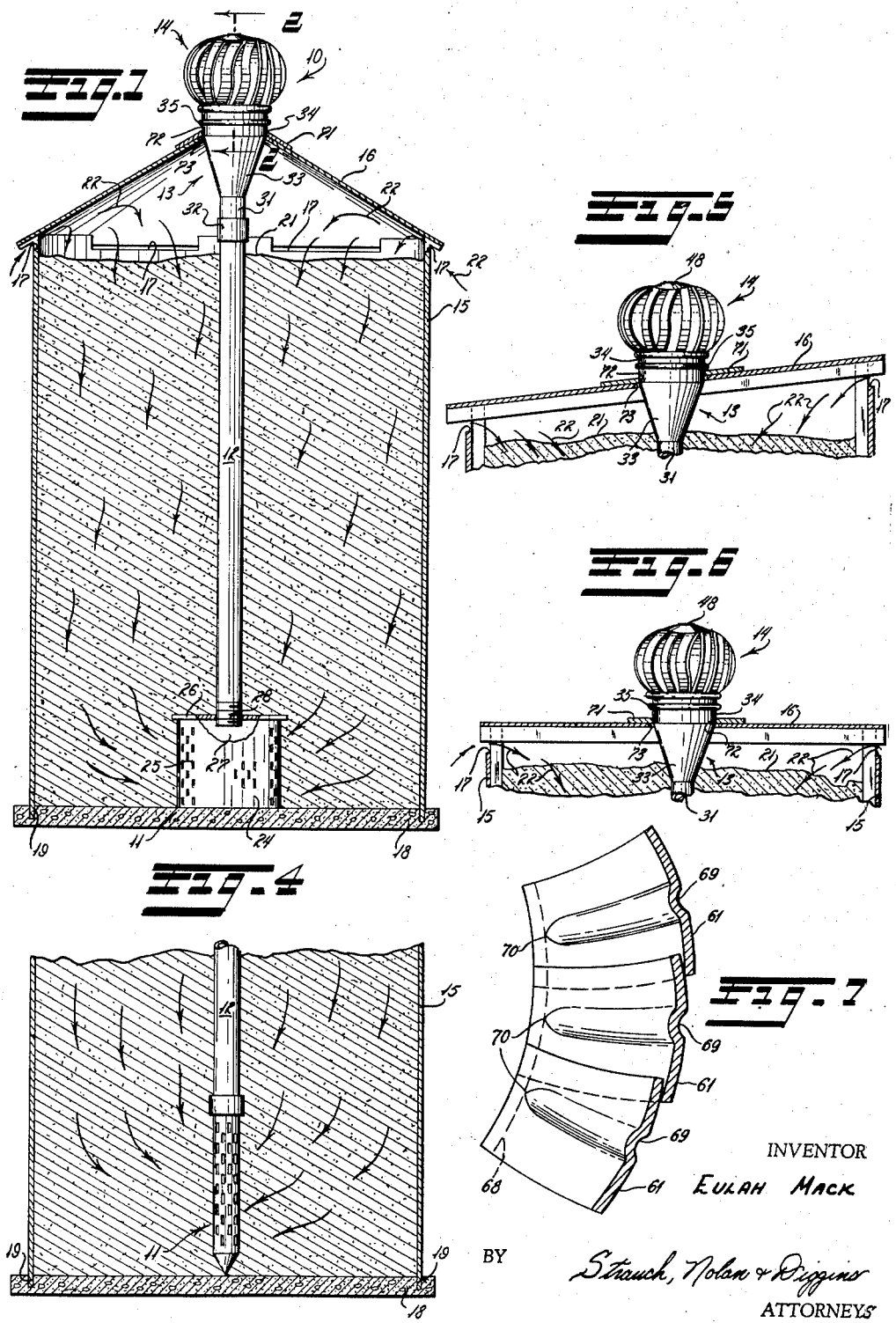
INVENTOR
EULAH MACK
BY
Strauch, Nolan & Diggins
ATTORNEYS Oct. 21, 1958
E. MACK
2,856,838
FARM PRODUCE OR LIKE AERATING DEVICE
Filed July 26, 1954
2 Sheets-Sheet 2
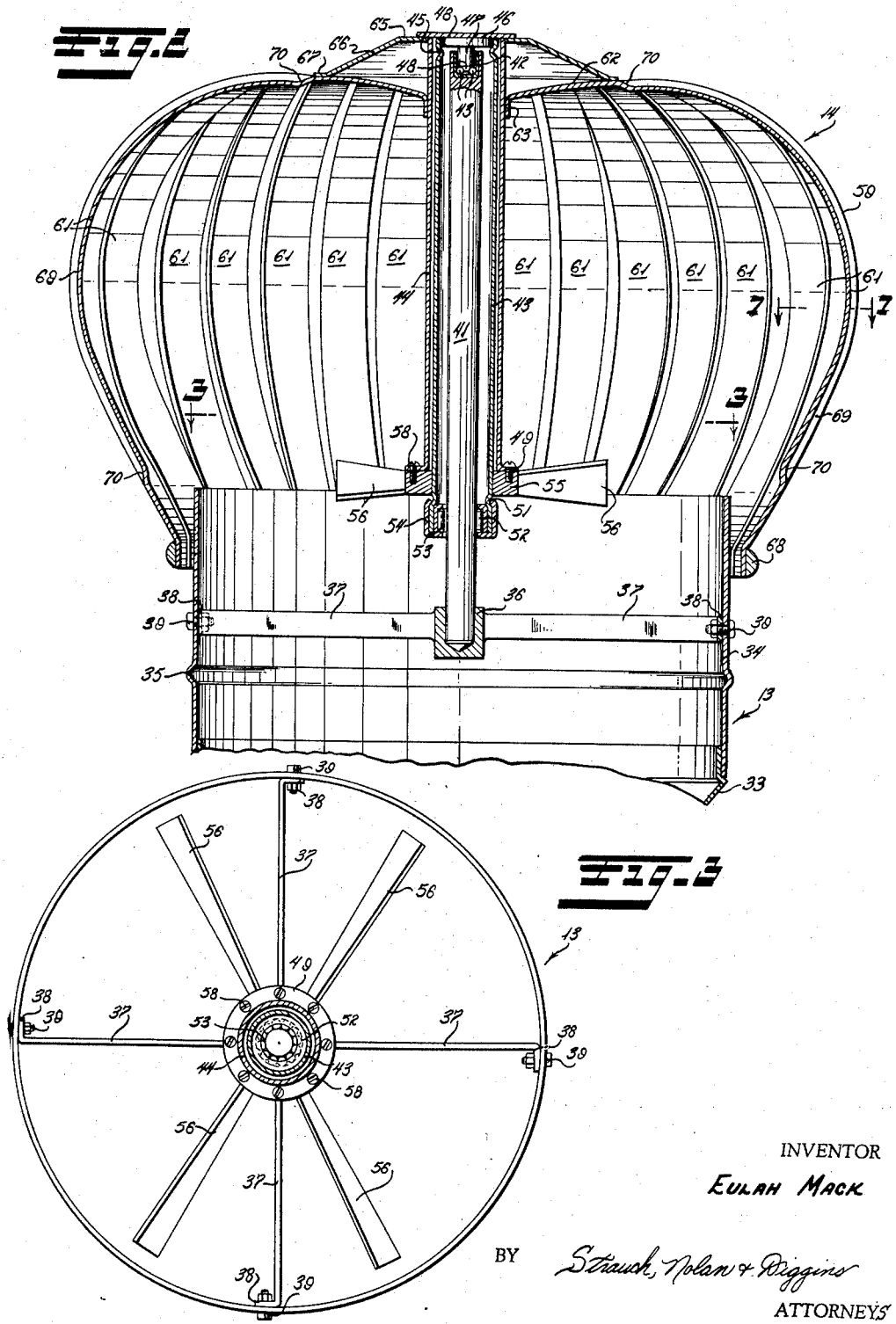
INVENTOR
EULAH MACK
BY Strauch, Nolan & Diggins
ATTORNEYS

United States Patent Office 2,856,838
Patented Oct. 21, 1958

2,856,838

FARM PRODUCE OR LIKE AERATING DEVICE

Eulah Mack, Scottsbluff, Nebr.

Application July 26, 1954, Serial No. 445,685

9 Claims. (Cl. 98—55)

The present invention relates to aerating devices and more particularly to an aerating device adapted to be disposed in stock-piled farm produce or the like to dissipate the heat and moisture which forms in such stockpiles and to assure circulation of ventilating air through the stock-piled produce or the like at all times to maintain the produce in dry relative cool condition to negative the progation of mold and vermin, such as weevils and the like.

While aerating devices have heretofore been proposed, as will be clear from a consideration of United States Letters Patent 1,317,309 issued September 30, 1919 and 1,369,537 issued February 22, 1929, both to J. D. Overholt, adequate washing of the stored farm produce such as grain, potatoes, and the like with fresh, cool drying air has not been satisfactorily effected with such devices since the air currents have a tendency to short circuit across the stock-pile into the perforated stack with the result that complette washing of the stock-piled produce is not obtained.

It, therefore, is a primary object of the present invention to provide a novel aerating device providing a novel breather chamber and draft tube to assure complete washing of the stored produce by fresh clean air at all times.

It is still another important object of this invention to provide a farm produce aerating device in which the passage of washing air is encouraged by natural conditions existing in and around the stock-piled produce to assure a strong circulation of large volumes of air through the stock-piled materials.

Still another object of the present invention resides in the provision of an aerating device of the character described adapted for installation in existing storage buildings and providing such an aerating device with a combined support and flashing structure adapting the device for operative association with varying style roofs.

Still another object of the present invention resides in the provision of an aerating device of the character described adapted for use in existing storage structures and having a probing end on the breather unit adapting said aerating device for insertion into stock-piled produce already in place in the storage structure.

It is another object of the present invention to provide a farm produce aerating device with a spinner head having draft inducing fan blades thereon for increasing the volume and speed of movement of the washing air through the produce and the aerating device.

Still another object of the present invention resides in providing a farm produce aerating device with a spinner head having vanes exposed to the prevailing winds in the atmosphere surrounding the stored produce and providing said vanes with a novel cross-sectional area adapted to effectively eliminate ingress of rain, snow and the like into the aerating device or the produce storage structure.

Still further objects of the invention will appear from the following description when read in conjunction with the appended claims and accompanying drawings wherein:

Figure 1 is a vertical sectional view through a grain storage structure of the silo or elevator type showing a preferred form of aerating device constructed in accordance with this invention installed therein for operation;

Figure 2 is an enlarged vertical sectional view through the spinner head provided for use in connection with the aerating device of the present invention;

Figure 3 is a sectional view taken along line 3—3 of Figure 2 looking in the direction of the arrows;

Figure 4 is a fragmental sectional view of the lower portion of a farm produce storage structure like that of Figure 1 illustrating a modified form of breather unit provided by the present invention and adapted to provide a probe for enabling insertion of the aerating device of this invention into an existing stock-pile of farm produce;

Figure 5 is a fragmental sectional view showing the spinner head and flashing support structure of the aerating device of this invention associated with a storage structure having a sloping roof;

Figure 6 is a view similar to Figure 5 illustrating the spinner head and flashing support structure of the present invention associated with a storage structure having a flat roof; and Figure 7 is a fragmental sectional view taken on line 7—7 of Figure 2 illustrating a suitable enshrouding vane structure to provide a wind driven head capable of preventing ingress of the elements while permitting free outward flow of the exhaust air from the aerator stack tube.

With continued reference to the drawings wherein like reference numerals are used throughout to indicate the same parts, the aerating device of this invention is generally indicated by reference numeral 10. Aerating device 10 is made up of four principal elements or sections, namely, a breather unit 11 adapted to be positioned at the base of the stock-piled produce, preferably in centered relation thereto, a draft tube 12 extending upwardly from breather unit 11 through the stock-piled produce preferably to a point beyond the top of the stockpile, a reducer or air circulating chamber section 13 connected to the upper end of draft tube 12 and a spinner head 14. Most effective use of the aerating device of this invention occurs when it is installed in a storage structure or building having imperforate side walls 15 topped by a roof 16 supported in spaced relation to the upper ends of the side walls to provide air passages 17 of relatively large area located under the eaves of the roof. While the side walls 15 may rest on the ground or any other supporting surface, it is preferable that the supporting surface be a concrete or like slab 18 and that the walls be suitably embedded therein as indicated at 19 and made of metal or other rodent resistant material. Farm produce, particularly grain, stock-piled or stored in such a structure completely fills the area between the side walls. As a result the admission of washing air is possible only through the eaves above the top surface 21 of the stock-piled produce as indicated by arrows 22. In order to cause this incoming fresh air to effectively wash down through and over the stock-piled grain or other farm produce a forced circulation of the air is essential.

The aerator of the present invention provides the necessary forced circulation of air in a manner to assure complete washing of the entire volume of stored produce as will now be pointed out. In the first place, the sole means for permitting entry of air into the aerating device 10 constitutes the breather unit 11 at the base of the stock-piled produce substantially at the center point thereof where the maximum heat and dampness would normally occur. This being so, the invention in its preferred form contemplates that breather unit 11 be in the form of a cylinder 24 of metal or other equally strong structural material having perforations 25 in its vertical wall and an end closure wall 26 at its upper end. As clearly appears from Figure 1 the axial length of cylinder 24 is quite short compared to the vertical dimension of the stock-piled produce so that a breather chamber 27 located at the point of most intense heat will be provided. While any suitable means may be provided for attaching the draft tube 12 to the cylindrical breather unit, the illustrated embodiment of Figure 1 contemplates that the draft tube be threaded at its end as indicated by reference numeral 28 for threaded engagement with a suitably tapped opening centrally formed in the end plate 26 of cylinder 24. From the description so far given it will be appreciated that breather chamber 27 will normally act as an accumulation chamber for the moist highly heated air in the stock-piled produce and that the normal tendencies of such highly heated air to rise will initially create a strong upsurge of air into and through draft tube 12. Since draft tube 12 itself extends upwardly through the central portion of the stock-piled produce, it also will be disposed in an area of high heat and will itself become heated and act in the manner of an ordinary radiator to heat the air within tube 12 causing it to flow upwardly through the draft tube and augment the natural tendency of the heated air in chamber 27 to flow upwardly. This updraft of air caused by the temperatures at the interior of the stock-piled produce causes an inflow of air into chamber 27 from the space between the grains or other farm produce at the base of the pile which inflowing air has to be replaced. Since the only possibility of replacement of this withdrawn air is from air in the stock-piled material at a level above the exhausted air it will be seen that a flow of air downwardly through the stock-piled material from the only source of replacement air, namely, the air inlets 17 under the eaves of the roof, will take place with the result that the entire body of stored produce will be thoroughly washed with relatively cool dry air from the outside of the storage structure.

Since it will be appreciated that the volume of air moved by means of chamber 27 and tube 12 because of the heat differential as heretofore pointed out will be relatively large and as the area of the top surface of the stored grain does not greatly exceed the volumetric capacity of the chamber 27, it will be appreciated that a relatively strong downflow of air through the stored produce will result merely from this heating of the air in chamber 27 and tube 12. It will further be appreciated that if tube 12 were to be perforated from end to end or at points above breather unit 11 a by-pass circuit for the incoming washing air would result so that areas of stagnant or immovable air would occur at varying points throughout the body of the stock-piled produce. The particular arrangement of breather unit and draft tube 12 of this invention, therefore, assures the elimination of any such stagnant air pockets and the uniform washing of the stored produce with fresh relatively cool dry air.

Recognizing that the coolness and dryness of the stored produce will depend largely upon the volume of air circulated through and passed over the produce in order to wash it, the present invention contemplates augmenting the thermal flow of air by means of a mechanical fan action. In order to accomplish this without expensive motive power, the present invention provides the reducer or air circulation chamber 13 made up of a coupling section 31 adapted to be coupled to the upper end of draft tube 12 by means of a coupling collar 32, a section of progressively increasing diameter in an upward direction indicated by numeral 33 and a cylindrical fan housing section 34 having approximately midway of its length a depressed rib 35 for reinforcing the chamber in well known manner. Just above rib 35 fan chamber 34 is provided with an upwardly facing cup-like socket 36 (Figure 2) coaxially disposed with respect to the axis of fan section 34 and having radially extending arms 37, preferably four in number (Figure 3), the outer ends of which are bent at right angles to provide securing tabs 38 adapting the arms for connection with the wall of fan section 34 by means of bolt and nut assemblies 39 or other suitable fasteners. These radial arms rigidly support socket 36 centrally of the fan chamber in position to receive the lower end of a spinner head support post 41. Post 41 preferably fits in socket 36 with a close or driven fit so as to be rigidly held in an upright position extending outwardly from the end of fan chamber 34. Since radiating arms 37 are of maximum width in an axial direction with respect to chamber 34, it will be appreciated that twisting and canting of socket 36 due to the axial protrusion of post 41 from socket 36 is effectively prevented.

The upper end of post 41 is counterbored as clearly indicated in Figure 2 to receive a hardened metal bearing cup 42 which is disposed in the counterbore with its end wall innermost and its bore opening outwardly of the upper end of post 41. This bearing cup is adapted to receive a plurality of ball bearings 43 arranged in annular side-by-side relation in the peripheral corner formed between the side wall and bottom wall of the bearing cut. Spinner head 14 preferably includes a centrally located, axially extending tubular housing section made up of an inner sleeve 43 and an outer sleeve 44. The upper end of inner sleeve 43 inwardly from its upper end is provided with an annular inwardly extending depression 45 forming an annular socket portion internally of the uppermost end dilimited at its inner end by the annular depression 45. This socket portion tightly receives the head 46 of headed stub shaft 47 the shank of which extends axially of inner sleeve 43 through and beyond annular depression 45 and terminates at its free end in a step bearing formation 48 adapted to extend into the center of the ring of ball bearings 43 and be supported thereby in spaced relation to the bottom and annular walls of the bearing cup 42.

The upper end of sleeve 43 and the socket portion formed thereby is suitably closed by an end plate 48 welded or otherwise secured to the end face of sleeve 43. Outer sleeve 44 is disposed in annularly spaced relation to sleeve 43 and is likewise secured at its upper end to plate 48 by welding or other equivalent means. The lower end of outer sleeve 44 terminates short of the lower end of inner sleeve 43 and is provided in suitable manner with a radially outwardly extending annular mounting flange 49, the purpose of which will be presently pointed out.

Inner sleeve 43 at its end extending beyond the lower end of sleeve 44 is annularly depressed as shown at 51 to form a downwardly opening bearing seat adapted to snugly receive the inner cage 52 of a needle bearing assembly including needle bearings 53 and an outer cage 54 which encircles the lower end of sleeve 43 and has its upper end peened or turned into the depression formed by annular inward depression 41 to secure the inner and outer cages 52 and 54 and the needles 53 against axial displacement with respect to sleeve 43. Inner sleeve 43 between the annular depression 51 and the flanged end 49 of outer sleeve 44 snugly receives hub 55 of a fan blade assembly including a plurality of fan blades 56 twisted to propel the air in fan chamber 34 axially outwardly thereof. As clearly seen in Figure 2, hub 55 is secured to annular flange 49 of sleeve 44 by machine screws 58 threaded into suitably tapped bores provided in hub 55.

Spinner head 14 is completed by a cowl structure 59 made up of a plurality of outwardly and downwardly curving vanes 61 integrally formed from a sheet metal disk, the hub portion 62 of which has a centrally disposed downturn flange 63 welded or otherwise secured to the outer surface of sleeve 44 adjacent its upper ends. To impart rigidity to the hub structure 62 a reinforcing disk 65 having a downwardly and outwardly inclined section 66 terminating in a generally radially extending securing flange 67 is respectfully welded at its opposite ends to the hub 62 and to the peripheral marginal edges of plate 48. The inner annular edge of disk 65 adjacent plate 48 lies in abutting engagement with the outer periphery of sleeve 44. Vanes 61 from their point of junction with hub 62 are preferably twisted in a direction to dispose the opposite faces of said vanes to respectively intercept the prevailing winds in the atmosphere and the heated air flowing from the aerating device. The lower ends of vanes 61 are respectively rigidly connected to a securing ring 68 freely encompassing the fan chamber 34. The vanes 61 are preferably depressed from the point of juncture with hub 62 to a point short of their lower ends along the axis to impart to the vanes a generally V-shaped configuration in cross-section so each vane provides along its outer exposed face an inwardly depressed groove 69, the upper and lower ends of which are indicated by numeral 70, adapted in use to collect rain, snow and the like and cause it to flow downwardly in said groove to a point of discharge beyond the periphery of fan chamber 34. This construction effectively prevents the entrance of rain, snow and other foreign matter into the end of fan chamber 34 and tends to direct it along a discharge path well beyond the periphery of fan chamber 34.

It will be clear from the foregoing description that the spinner head 14 is efficiently designed to freely rotate under influence of external breezes and the thermally circulated air traversing tube 12. Such rotation causes fan blades 56 to augment the upward flow through tube 12 and produce an exceedingly strong circulation of air downward through the stock-piled produce with the result that the heat and moisture that would otherwise form in the interior of the stock-piled produce will be effectively and completely eliminated.

In order to provide a firm support for the upper end of draft tube 12 and air circulation chamber 13, the present invention slidingly attaches a sheet metal flashing 71 externally to the lower end of air circulation chamber 34 by means of a circular hole 72. Hole 72 is preferably sufficiently large to permit bending of the portions of flashing 71 lying at either side of a diameter through hole 72 downwardly as shown in Figure 1, or in opposite directions as shown in Figure 5 to engage the face of the roof adjacent chamber 34. These portions are preferably secured to the roof by suitable fasteners so as to mount chamber 34 in centered annularly spaced relation to the roof opening provided for installation of aerator 10 as indicated at 73. It is to be understood that when flashing 71 is fitted to a conical roof such as that resulting from a circular silo type storage structure like that depicted in Figure 1, the flashing will be slit radially from its outer edge into the opening 72 so that it may be overlapped and brought into the form of a conic section.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An aerating device for stored farm produce and the like piled on a support surface comprising an imperforate draft tube of a length exceeding the height of the piled produce disposed centrally of the produce pile and extending downwardly into the produce pile sufficiently to position one end of the tube spaced from the support surface a fractional increment of the pile height and the other end protruding beyond the top of the produce pile into the atmosphere and a breather element having a perforated wall spanning the space between said support surface and said one end of said tube connected to said one tube end and resting on said support surface; wind driven propulsion means having inlet and outlet ends connected by its inlet end to said protruding end of said tube, support means therein, fan means including journal means journalled on said support means and operative to induce a flow of air from said one end of and through said draft tube to the atmosphere and a wind driven bladed propulsion head secured to said fan means and of generally inverted bowl configuration dimensioned and formed to enshroud said housing outlet end and prevent ingress of the elements and foreign substances into said propulsion means and the other end of said tube, said breather element, imperforate tube, fan means and wind driven bladed propulsion means cooperating to prevent intermixing of the warm moist exhaust air and relatively cooler ambient air in the protruding cool elements of the tube, to assure a clear air exhaust tube open at its other end to the atmosphere and at its said one end only to the bottom of the pile of produce and to create a strong flow of air inwardly through said produce pile, inwardly through said perforated wall into said breather element to said one end of said tube and up through said imperforate tube and said wind driven propulsion means and outwardly through said wind driven propulsion head into the atmosphere thereby removing the hot, moist air from the produce pile and replacing said removed air by fresh relative dry air drawn in through said pile of produce to cool and dehumidify the grain in said pile.

2. The aerating device of claim 1 wherein said support means includes an upstanding centered post, the wind driven propulsion means is rotatably mounted at the other end of said tube on said upstanding centered post and provides fan blades disposed adjacent the upper end of said tube and arranged to create a high speed updraft of air through said tube and propeller blades spaced above said other end of said tube and open at their center to receive the exhaust air from said fan blades and expel the exhaust air through said propeller blades into the atmosphere upon rotation of said propulsion means.

3. The aerating device of claim 2 wherein the wind driven bladed propulsion head comprises a head made up of a plurality of generally axially extending, outwardly bowed vanes arranged in annularly spaced relation to intercept currents of ambient air thereby imparting rotation to said fan blades and directing said ambient air along a discharge path well beyond the periphery of said other end of said tube.

4. The combination defined in claim 1 wherein said support means provides an upwardly extending, centered, rigid support post; said wind driven bladed propulsion head comprises an inverted, generally bowl shaped, spinner head the sidewalls of which are formed by annularly spaced, axially spirally directed vanes extending into peripherally encompassing relation to said other tube end and said fan journal means comprises an axially extending coaxially arranged sleeve-like hub element of substantial length adapted to house said support post and rigidly mount said spinner head on its upper end; said fan blades are disposed at the lower end of said hub element in radially outwardly extending relation and are shaped to induce a flow of air upwardly through said tube; and bearing means are provided at the opposite ends of said hub element for journalling said spinner head and said fan blades on said support post.

5. The combination defined in claim 4 wherein said spinner head vanes are axially grooved to form a series of annularly spaced, downwardly spiralling trough structures for collecting rain water and the like and directing it to the outside of said tube.

6. In combination with a roofed storage structure having imperforate sidewalls and providing air inlet passages adjacent the eaves of the roof and an aerating device comprising a cylinder of a length substantially less than the height of the storage structure walls and having a perforated cylindrical wall disposed with one end resting on the floor of said storage structure at its center, an imperforate tube connected to the other end of said cylinder and having an end extending upwardly through the roof to provide a fluid conduit between said perforated cylinder and the atmosphere outside said storage structure and means sealing the space between said roof and tube against ingress of the elements and foreign matter: air circulating and unidirectional flow promoting means comprising wind driven propulsion means having inlet and outlet ends connected by its outlet end to said tube end above said roof, support means therein, fan means including journal means journalled on said support means and operative to induce a flow of air from said cylinder up through said imperforate tube to the atmosphere and a wind driven bladed propulsion head means secured to said fan means and of generally inverted bowl shaped configuration dimensioned and formed to enshroud said tube end and prevent ingress of the elements and foreign matter into said head means and the upper end of said tube while assuring free egress of air therethrough to the outside atmosphere and upon rotation of said head means, to drive said fan means to create a strong ascending flow of air in said tube sufficient to evacuate said cylinder and overcome the normal ascending thermal air flow in said storage structure outside of said cylinder and establish a counter flow of air in through the air inlet passages under the roof eaves from the adjacent ambient air, then down through the storage structure toward and into said perforated cylinder disposed at the center of maximum heat of the stored produce in said storage structure, said perforated cylinder, said imperforate tube and said head means forming a breather assembly assuring the application of the full flow propulsion force of said fan means at the point of concentration of the hot humid air and a clear discharge passage to the atmosphere free of contact with the cooling ambient air and the elements for removing the hot moist air out of contact with the stored produce.

7. The combination defined in claim 6 wherein said perforated cylinder wall is of substantially greater diameter than said tube and has its upper end closed by an end plate having a central boss adapted to receive the lower end of said tube and support said tube with its lower end spaced from the floor of said storage structure.

8. A breather assembly for use in an aerating device for dissipating heat and moisture formed in piles of stored farm produce and the like comprising a breather unit in the form of a relatively short perforated cylinder adapted to be positioned in end supported relation on the support surface for the piled produce substantially at the geometric center thereof and having an end opening at its upper end; an imperforate draft tube disposed with one end in fluid communication with said end opening and of a length sufficient to extend vertically through said piled produce to dispose its other end above the top of the piled produce; a transition member coupled to the upper end of said tube and having a coupling portion of a diameter approximately equal to the diameter of said draft tube, a transition portion of progressively increasing diameter in an upward direction and a cylindrical air exhausting terminal portion having an inner diameter substantially exceeding the diameter of said draft tube; a support means supported on the upper end of said transition member including a post having upper and lower bearing means disposed in centered upstanding relation to said cylindrical air exhausting terminal portion; and air propulsion means journalled on said support post by said bearing means and comprising a wind driven spinner head comprising outwardly bowed, annularly related propulsion vanes having their adjacent edges overlapping and disposed to enshroud the upper end of said cylindrical terminal portion and to prevent ingress of the elements and foreign substances into said propulsion means and said cylindrical air exhausting terminal portion, a hollow support shaft having an end rigidly secured to said propulsion vanes and extending axially of said propulsion vanes in centered relation thereto and air propelling fan blades at the other end of said shaft in said air exhausting terminal portion and having a length substantially equalling the inner diameter of said cylindrical air exhausting terminal portion to effect upward movement of a volume of air greater than that passing unaided through said draft tube thereby assuring a strong upward flow of air through said tube.

9. A breather assembly for use in an aerating device for dissipating heat and moisture formed in piles of stored farm produce and the like comprising a breather unit in the form of a relatively short perforated cylinder adapted to be positioned in the piled produce substantially at the lower central portion thereof and having an end opening at its upper end; an imperforate draft tube of a length sufficient to extend vertically through said piled produce to dispose its upper end above the top of the piled produce; means for connecting the other end of said draft tube to said opening of said perforated cylinder to provide fluid communication between said perforated cylinder and said draft tube; a transition member coupled to the upper end of said tube and having a roof coupling portion and air propulsion means supported by the upper end of said transition member and comprising air propelling blades rotatably mounted therein to effect a strong air flow upward through said draft tube and a wind driven spinner head comprising outwardly bowed annularly related propulsion vanes having their adjacent edges overlapping and disposed to enshroud the upper end of said transition member and prevent ingress of the elements and foreign substances into said propulsion means.

References Cited in the file of this patent

UNITED STATES PATENTS

| | | |
|---|---|---|
| 656,597 | Champagne | Aug. 21, 1900 |
| 846,211 | Johnson | Mar. 5, 1907 |
| 1,191,141 | Allsteadt | July 18, 1916 |
| 1,369,537 | Overholt | Feb. 22, 1921 |
| 1,686,871 | Meek | Oct. 9, 1928 |
| 1,702,120 | Kimball | Feb. 12, 1929 |
| 1,763,627 | Oberlin | June 10, 1930 |
| 1,965,171 | Boyer | July 3, 1934 |
| 2,695,461 | Langley et al. | Nov. 30, 1954 |
| 2,720,825 | Noel | Oct. 18, 1955 |
| 2,797,632 | Hook | July 2, 1957 |

FOREIGN PATENTS

| | | |
|---|---|---|
| 614,965 | France | Apr. 22, 1926 |
| 301,531 | Great Britain | Nov. 30, 1928 |